United States Patent [19]

Shimazawa et al.

[11] 4,357,617

[45] Nov. 2, 1982

[54] INK RECIRCULATING DEVICE OF INK JET PRINTER

[75] Inventors: Yoichi Shimazawa; Toshiaki Kawamoto, both of Nara, Japan

[73] Assignee: Sharp Kabushiki Kaisha, Osaka, Japan

[21] Appl. No.: 52,312

[22] Filed: Jun. 26, 1979

[30] Foreign Application Priority Data

Jun. 29, 1978 [JP] Japan .................................. 53/79864

[51] Int. Cl.$^3$ .............................................. G01D 15/18

[52] U.S. Cl. .................................. 346/140 R; 346/75; 417/521

[58] Field of Search ............................. 346/75, 140 IJ; 417/521

[56] References Cited

U.S. PATENT DOCUMENTS

| | | | |
|---|---|---|---|
| 1,271,712 | 7/1918 | Humphrey et al. | 417/268 |
| 2,368,187 | 1/1945 | Williams | 417/521 |
| 2,928,351 | 3/1960 | Klingler | 92/49 |
| 3,139,156 | 6/1964 | Urso | 417/521 |
| 3,169,821 | 2/1965 | Miller | 346/140 |
| 3,488,763 | 1/1970 | Lofquist | 92/98 D |
| 3,761,953 | 9/1973 | Helgeson | 346/75 |
| 3,765,802 | 10/1973 | Leitermann et al. | 417/521 |
| 3,769,630 | 10/1973 | Hill | 346/75 |
| 3,771,912 | 11/1973 | Conlee | 417/521 |
| 3,831,727 | 8/1974 | Kruspe et al. | 346/75 X |
| 3,844,689 | 10/1974 | Weatherston | 417/244 |
| 3,929,071 | 12/1975 | Cialone et al. | 346/140 R X |
| 3,930,258 | 12/1975 | Dick et al. | 346/75 |
| 3,961,337 | 6/1976 | Jung et al. | 346/140 R |
| 4,050,078 | 9/1977 | Isayama et al. | 346/140 R |
| 4,053,902 | 10/1977 | Skafvenstedt et al. | 346/140 R |
| 4,067,020 | 1/1978 | Arway | 346/140 R X |
| 4,079,384 | 3/1978 | Takano et al. | 346/140 R |
| 4,084,165 | 4/1978 | Skafvenstedt et al. | 346/140 R |
| 4,089,007 | 5/1978 | Perry | 346/75 X |
| 4,204,215 | 5/1980 | Nakarai | 346/140 R |
| 4,270,133 | 5/1981 | Shimazawa | 346/140 R |

FOREIGN PATENT DOCUMENTS

| | | | |
|---|---|---|---|
| 166769 | 1/1906 | Fed. Rep. of Germany | 417/254 |
| 670037 | 1/1934 | Fed. Rep. of Germany | 417/254 |
| 427404 | 1/1974 | Fed. Rep. of Germany | 417/266 |
| 2454956 | 5/1976 | Fed. Rep. of Germany | 417/266 |
| 2645851 | 4/1977 | Fed. Rep. of Germany | 346/140 R |
| 2273961 | 6/1974 | France | 417/534 |
| 2247111 | 2/1975 | France | 417/437 |
| 3058 | of 1884 | United Kingdom | 92/91 |

*Primary Examiner*—Joseph W. Hartary

*Attorney, Agent, or Firm*—Birch, Stewart, Kolasch & Birch

[57] ABSTRACT

The present invention is directed to an ink jet system printer comprises a carriage carrying a nozzle for discharging ink droplets towards a recording medium in response to an ink supply device, deflection means for selectively deflecting the ink droplets for recording purposes, and a beam gutter for collecting an amount of the ink droplets which are not contributive to the recording purposes. A pump means is connected to the beam gutter for feeding the amount of the ink droplets back to the ink supply device. In a specific form of the present invention, the pump is combined with a ink supply pump for supplying the nozzle with ink, the ink supply pump being part of the ink supply device.

17 Claims, 3 Drawing Figures

INK RECIRCULATING DEVICE OF INK JET PRINTER

BACKGROUND OF THE INVENTION

The present invention relates to an ink jet printer and, more particularly, to an ink recirculating device useful for an ink jet printer.

A conventional ink jet printer includes a carriage carrying a nozzle, a pair of charging electrodes and a pair of deflection electrodes, and a beam gutter as disclosed in, for example, Japanese Laid Open No. 49-42241 published on Apr. 20, 1974.

The carriage is drive to to reciprocate along slidable shaft means in the lateral direction. Desired patterns are formed on a record receiving sheet by mean of ink drops dispersed from the nozzle. The residual of the ink drops not contributive to recording purposes is collected by the beam gutter and fed back to an ink reservoir through a collection pipe.

Conventionally the residual of the ink drops has been returned from the beam gutter to the ink reservoir by virtue of the difference in height between the beam gutter and the ink reservoir. Therefore, the collection pipe should be thick due to problems with high viscosity and surface tension of the ink used. Further, the ink reservoir must be positioned under the beam gutter to collect the residual. This ink collection system is disclosed in Takano et al U.S. Pat. No. 4,007,684, for example.

In the above-mentioned conventional ink collection system, an ink receiver is arranged under the beam gutter to accept collected ink from the beam gutter. The ink receiver should be extended so as to cover a travelling interval of the carriage. The collected ink dropping on the ink-receiver is liable to increase its viscosity due to the vaporization of a solvent in the ink. Dust is inevitably deposited on the ink receiver so that a filter for cleaning the ink to be used is damaged in a short time. Speedy acceleration of the carriage makes it impossible for the ink receiver to catch a certain amount of the ink. Such ink may contaminate the ink jet printer by its dispersion.

OBJECTS AND SUMMARY OF THE INVENTION

With the foregoing in mind, it is the main object of the present invention to provide an improved ink jet printer.

More particularly, it is an object of the present invention to provide an improved ink collection device adapted for use in an ink jet printer.

It is a further object of the present invention to provide an improved ink collection system comprising a beam gutter carried on a carriage, the beam gutter being connected to a suitable pump which returns collected ink to an ink reservoir without any mixture of dust in the collected ink or evaporation of the collected ink.

It is a further object of the present invention to provide an improved ink supply and collection system comprising a pump which functions to supply a nozzle ink and returns ink non-used for recording purposes to an ink reservoir. The ink supply and collection system can be positioned at any location in connection with a beam gutter.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To obtain the above objectives, pursuant to an embodiment of the present invention, an ink jet system printer comprises a carriage carrying a nozzle for discharging ink droplets toward a recording medium in response to an ink supply device, deflection means for selectively deflecting the ink droplets for recording purposes, and a beam gutter for collecting the amount of the ink droplets which are not contributive to the recording purposes. A pump is connected to the beam gutter for feeding the amount of the ink droplets back to the ink supply device.

In a specific form of the present invention, the pump is combined with an ink supply pump for supplying the nozzle with ink, the ink supply pump being part of the ink supply device.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
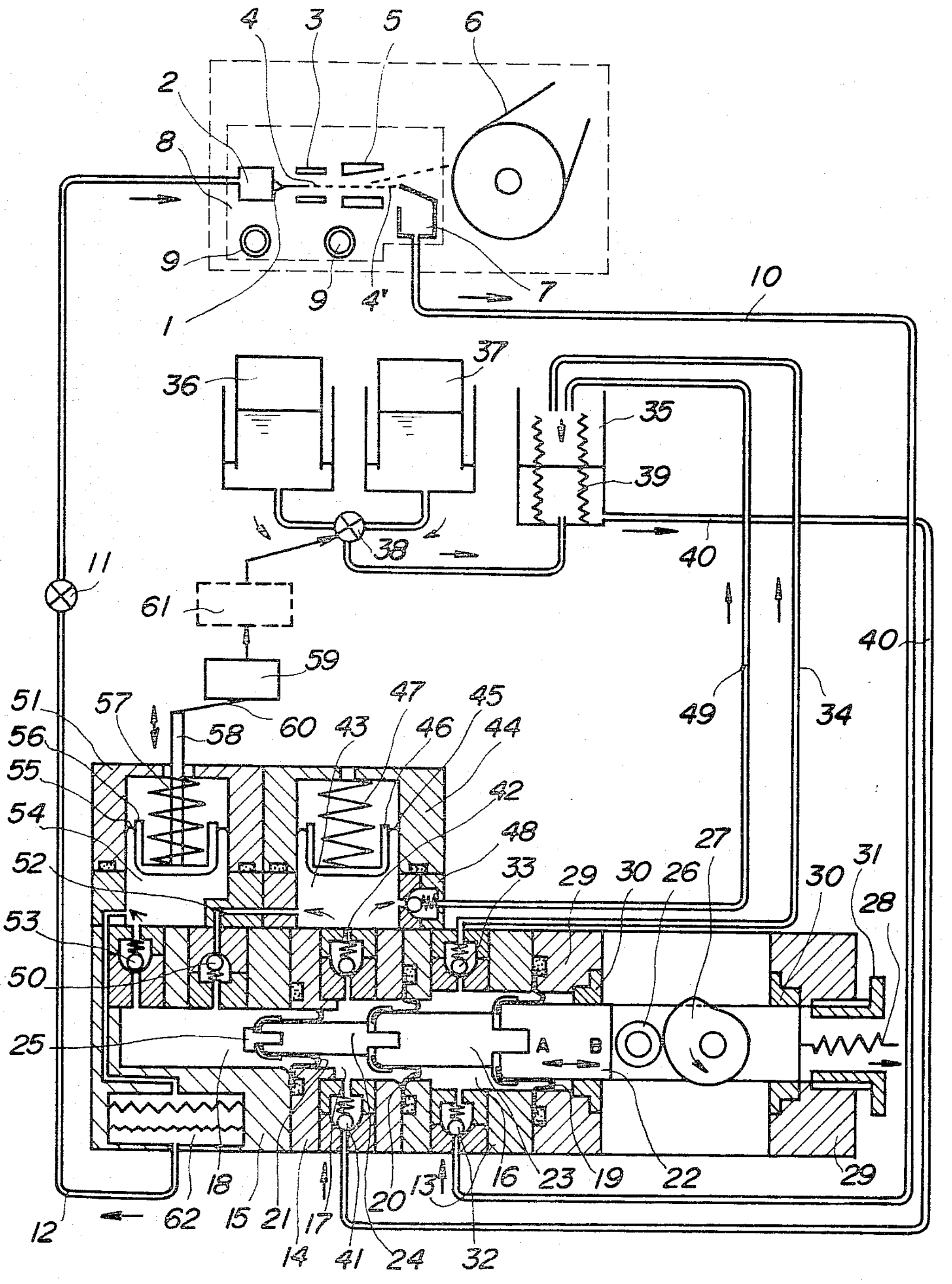
FIG. 1 is a diagrammatic representation of a specific example of an ink jet printer system made in accordance with the present invention.

FIG. 1 shows an ink jet system printer embodying the present invention.

The ink jet system printer mainly comprises a print forming section and an ink liquid supply system.

The print forming section of an ink jet system printer of the charge amplitude controlling type comprises a nozzle 1 for emitting an ink liquid supplied from the ink liquid supply system through an electromagnetic valve 11. An electromechanical transducer 2 is attached to the nozzle 1 to vibrate the nozzle 1 at a given frequency, thereby forming ink droplets 4 at the given frequency. The thus formed ink droplets 4, which are emitted from the nozzle 1, are charged through the use of a charging electrode 3 in accordance with a print information signal. The thus charged ink droplets 4 are deflected while they pass through a constant high voltage electric field established by a pair of deflection electrodes 5 in accordance with charge amplitudes carried thereon, and directed to a record receiving paper 6. Ink droplets 4' not contributing to the actual print operation are not charged and are directed to a beam gutter 7 for recirculation purposes.

The above-mentioned nozzle 1, electromechanical transducer 2, charging electrode 3, deflection electrodes 5 and beam gutter 7 are mounted on a carriage 8 (shown by broken lines), which is driven to reciprocate along slidable shafts 9 in the lateral direction. That is, the deflection caused by the deflection electrodes 5 is effected in the vertical direction, and the carriage 8 is driven to travel in the lateral direction, whereby desired patterns are formed on the record receiving paper 6 in the dot matrix fashion.

The ink liquid collected by the beam gutter 7 is returned to the ink liquid supply system through a conduit 10. The thus returned ink liquid is introduced into a constant flow rate pump, which develops the ink liquid of a fixed flow rate and a fixed viscosity to be applied to the nozzle 1 through a conduit 12 and the electromagnetic valve 11. The constant flow rate and constant viscosity ink liquid is highly required to ensure accurate printing or to stabilize the droplet formation.

The constant flow rate pump comprises three coaxial cylinders 13, 14 and 15, and three bellows 19, 20 and 21, which, in combination, determine three pressure chambers, a first pressure chamber 16, a second pressure chamber 17 and a third pressure chamber 18. The pressure in each pressure chamber is varied by shifting the bellows or diaphragms 19, 20 and 21 along the axis of the cylinder.

More specifically, the bellows 19 has a larger diameter than the bellows 20, which has a larger diameter than the bellows 21. The outer periphery of the bellows 19 is fixed between the cylinder 13 and a bearing supporter 29. The inner periphery of the bellows 19 is fixed to an end of a piston 22. The outer periphery of the bellows 20 is held between the cylinder 13 and cylinder 14, and the inner periphery thereof is secured to an end of a piston 23. The outer periphery of the bellows 21 is supported by the cylinders 14 and 15, and the inner periphery thereof is fixed to an end of a piston 24 through the use of a fixing cap and a screw 25. The pistons 22, 23 and 24 are coaxially connected to each other with the intervention of fixing caps and the inner peripheries of the bellows 19 and 20. The piston 22 has a longer diameter than the piston 23, which, in turn, has a longer diameter than the piston 24.

An eccentric cam 27 connected to a driven source (not shown), and a roller 26 are provided to shift the piston 22 in the direction shown by arrows A and B. A spring 28 is fixed to the other end of the piston 22 to bias the roller 26 into contact with the eccentric cam 27. When the piston 22 is reciprocated, the pistons 23 and 24 are also reciprocated in unison with the piston 22 and, therefore, the bellows 19, 20 and 21 perform the rolling movement. This creates the variation of the pressure in each pressure chamber 16, 17 and 18.

The piston 22 is slidably supported by a bearing 30, which is secured to the bearing supporter 29. The stroke value of the pistons 22, 23 and 24 is adjustable through the use of a flow rate adjusting screw 31 coupled to an opening of the bearing supporter 29. That is, the flow rate is controllable through the use of the flow rate adjusting screw 31.

An inlet valve 32 is provided in the cylinder 13 to communicate the pressure chamber 16 with the conduit 10 connected to the beam gutter 7. An outlet valve 33 is also provided in the cylinder 13 for communicating the pressure chamber 16 to a subtank 35 through a conduit 34. The subtank 35 receives the collected ink liquid through the conduit 34, and a new ink liquid contained in an ink cartridge 36 through a switching electromagnetic valve 38. The subtank 35 is constructed so that a constant amount of ink liquid is always contained therein.

An ink solvent cartridge 37 contains a solvent, which is selectively applied to the subtank 35 through the switching electromagnetic valve 38. A filter 39 is disposed in the subtank 35. The ink liquid contained in the subtank 35 is introduced into the pressure chamber 17 through the filter 39, a conduit 40 and an inlet valve 41.

The pressure chamber 17 is also connected to a pressure accumulator 43 via an outlet valve 42. The pressure accumulator 43 comprises a cylinder 44, a bellows 45 of which the outer periphery is fixed to the cylinder 44, and a spring 47 for depressing the bellows 45 downward via a cap 46. The cylinder 44 is provided with an outlet valve 48, which is connected to the subtank 35 through a conduit 49.

A conduit 52 is formed in the cylinder 44 and in another cylinder 51 in order to communicate the pressure accumulator 43 with the pressure chamber 18 through an inlet valve 50 formed in the cylinder 15. The pressure chamber 18 is also communicated with another pressure accumulator 54 via an outlet valve 53 formed in the cylinder 15. The pressure accumulator 54 comprises the cylinder 51, a bellows 55 disposed in the cylinder 51, the outer periphery of the bellows 55 being fixed to the cylinder 51, and a spring 57 for depressing the bellows 55 downward via a cap 56.

A pole 58 is fixed to the cap 56 in such a manner that the pole 58 extends upward through the cylinder 51. The end of the pole 58 is associated with an actuator 60 of a microswitch 59. The microswitch 59 is associated with a valve drive circuit 61 for selectively switching the electromagnetic valve 38. As already discussed above, the switching electromagnetic valve 38 functions to selectively supply the subtank 35 with the new ink liquid contained in the ink cartridge 36 and the solvent contained in the ink solvent cartridge 37, thereby maintaining the ink viscosity at a constant value.

The pressure accumulator 54 is connected to the conduit 12 through a filter 62. The above-mentioned inlet or outlet valves comprise a ball valve, a valve seat and a spring for depressing the ball valve against the valve seat, respectively.

When the eccentric cam 27 is driven to rotate, the piston 22 is reciprocated. At the same time, the pistons 23 and 24 are reciprocated, whereby the ink liquid of the constant flow rate is emitted from the nozzle 1. The ink liquid collected by the beam gutter 7 is introduced into the pressure chamber 16 at the timing when the piston 22 is driven to travel in the direction shown by the arrow B. This is because the pressure in the pressure chamber 16 is reduced when the piston 22 travels in the direction shown by the arrow B due to the diameter difference between the bellows 19 and 20. The ink liquid introduced into the pressure chamber 16 is supplied to the subtank 35 when the piston 22 travels in the direction shown by the arrow A, because the pressure in the pressure chamber 16 is increased. As already discussed, the new ink is supplied from the ink cartridge 36 to the subtank 35 to maintain the amount of ink liquid contained in the subtank 35 at the constant value.

The pressure in the pressure chamber 17 is reduced when the pistons 22, 23 and 24 travel in the direction shown by the arrow B, because the bellows 20 is larger than the bellows 21. The inlet valve 41 is opened to introduce the ink liquid from the subtank 35 to the pressure chamber 17. The thus introduced ink liquid does not include any dust or bubbles because the filter 39 is disposed in the subtank 35. At this moment, the pressure in the pressure chamber 18 is reduced below that of the pressure accumulator 43. Therefore, the ink liquid contained in the pressure accumulator 43 in introduced into the pressure chamber 18 through the inlet valve 50. The introduction of the ink liquid into the pressure chamber 18 is effectively conducted. This smooth introduction of the ink liquid ensures the constant flow rate ink liquid supply.

On the other hand, the pressure in the pressure chambers 17 and 18 is increased when the pistons 22, 23 and 24 travel in the direction shown by the arrow A. The ink liquid in the pressure chamber 17 is developed toward the pressure accumulator 43 through the outlet valve 42. The ink liquid in the pressure chamber 18 is supplied to the pressure accumulator 54 through the outlet valve 53. The ink liquid contained in the pressure accumulator 54 is fed to the nozzle 1 through the filter 62, where the dust is removed, the conduit 12 and the electromagnetic valve 11.

Therefore, the nozzel 1 emits the ink liquid at the constant flow rate.

The ink liquid amount developed from the pressure chamber 18 to the pressure accumulator 54 is less than that from the pressure chamber 17 to the pressure accumulator 43 and, therefore, there is a possibility that the pressure in the pressure accumulator 43 or the pressure chamber 17 becomes greater than that in the pressure chamber 18. In this case, the outlet valve 48 is opened when the pressure in the pressure accumulator 43 becomes greater than a preselected value, whereby the ink liquid contained in the pressure accumulator 43 is led to the subtank 35 through the conduit 49. Therefore, when the pistons 22, 23 and 24 travel in the direction shown by the arrow A, the pressure in the pressure accumulator 43 never become higher than that in the pressure chamber 18 and the inlet valve 50 is not opened. More specifically, the pressure in the pressure accumulator 43 is held below the predetermined value to preclude the deformation of the bellows 21. As discussed above, the pressure in the pressure chamber 18 is always higher than that in the pressure chamber 17 without regard to the travel direction of the pistons 22, 23 and 24. Therefore, the ink liquid supplied through the conduit 12 is supplied at the constant flow rate as long as the bellows 21 is not deformed and the cam 27 is rotated at a constant speed. That is, the ink liquid is emitted from the nozzle 1 at the constant flow rate.

As far as the stroke length of the piston 22 is maintained constant and the rate of the reciprocating motion of the piston 22 is also constant under a uniform driving force of the eccentric cam 27, thus a constant quantity of the ink liquid flows regardless of its varying exhaustion pressure.

Figure 2:
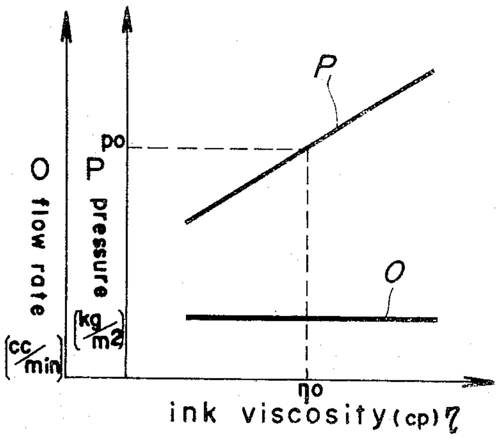
FIG. 2 is a graph showing a relation between viscosity of the ink, pressure in an accummulator, and an amount of ink flow emitted from an ink nozzle.

FIG. 2 illustrates variations of pressure in the pressure accumulator 54 which is changed according to the variations of the viscosity of the ink liquid. The variations in the viscosity in the ink liquid come from temperature changes and evaporation of a solvent for the ink liquid. The variations in the viscosity causes a change of the resistivity of the ink liquid in the nozzle 1 which affects the pressure in the pressure accumulator 54.

With reference to FIG. 2, the amount of flow of the ink liquid may become constant regardless of the varying viscosity of the ink liquid. As the viscosity of the ink liquid increases, the pressure in the pressure accumulator 54 referring to P increases. By detecting the pressure P in the pressure accumulator 54, the electromagnetic valve 38 is actuated so as to switch from a flow of the ink liquid contained within the ink cartridge 36 to a flow of the solvent within the ink solvent cartridge 37.

The electromagnetic valve 38 is changed at a pressure of $P_o$ in the pressure accumulator 54. It is preferable that the preset pressure of $P_o$ be below a value at which particles of the ink liquid are regularly combined. This results in keeping the viscosity of the ink liquid substantially constant.

The above mentioned variation of the pressure is detected in the pressure accumulator 54, which is changed according to the variations of the viscosity of the ink liquid. The pressure in the pressure accumulator 54 is detected by the bellows 55 in terms of their displacement along the direction by a line with the arrow head with the aid of the spring 57.

When the pressure in the pressure accumulator 54 is equal to the preset pressure $P_o$ or more, the microswitch 59 is operated by the rise of the pole 58, which is connected to the cap 56, allowing the actuator 60 to energize the microswitch 59.

As a result the valve drive circuit 61 is operated so that the electromagnetic valve 38 is switched to allow the solvent to flow from the ink solvent cartridge 37 to the subtank 35. Therefore, the ink liquid contained within the subtank 35, which is to be dispersed from the nozzle 1, always has a constant viscosity.

When the viscosity of the ink liquid is equal to a preset value or level, the $\eta_o$ pressure in the pressure accumulator 54 is decreased to thereby lower the pole 58. This is maintained before the electromagnetic valve 38 is returned to conduct the ink liquid from the ink liquid cartridge 36 to the subtank 35.

The microswitch 59 can be replaced by a conventional pressure transducer to detect the pressure variation in the pressure accumulator 54, thereby energizing the valve drive circuit 61 for controlling the electromagnetic valve 38.

Figure 3:
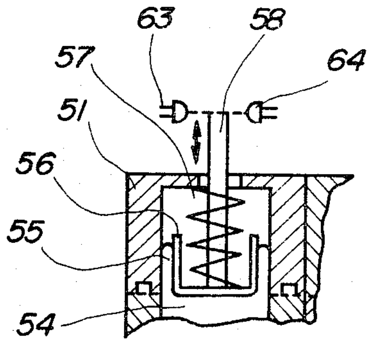
FIG. 3 is a section view of another accumulator according to the present invention.

FIG. 3 shows a sectional view of another pressure accumulator assembly. Like elements corresponding to those of FIG. 1 are indicated by like numerals.

With reference to FIG. 3, a pair of photo elements 63 and 64 are provided for sensing the movement of the pole 58.

As described earlier, the main feature of the present invention is that the ink collection pump is provided for returning the collected ink droplets through the beam gutter to the ink supply device. The collection conduit is provided for directly connecting the beam gutter with the ink collection pump. This explains why mixture of dust into the collected ink droplets is very small and evaporation of the collected ink droplets is suppressed.

In view of the fact that the collected ink droplets are automatically absorbed by the ink collection pump, there is a great flexibility in designing to allocate the beam gutter in connection with the ink supply system including the ink collection pump. A thin conduit can be adopted for the collection conduit.

The collection pump can be composed by adding another coaxial cylinder to a conventional ink supply device to incorporate the ink collection pump with the ink supply device.

While only certain embodiments of the present invention have been described, it will be apparent to those skilled in the art that various changes and modifications may be made therein without departing from the spirit and scope of the invention as claimed.

What is claimed is:

1. An ink jet system printer comprising:

a carriage means carrying a nozzle for discharging ink droplets toward a recording medium in response to an ink supply device, and deflection means for selectively deflecting the ink droplets for recording purposes;

a beam gutter means carried on the carriage means for collecting the ink droplets which are not contributive to the recording purposes;

a pump means including a piston mounted within a housing having a plurality of diaphragms disposed along the length thereof, said diaphragms being at least three in number and forming at least three pressure chambers therebetween for drawing in or forcing out ink; and a first pressure chamber operatively connected to the beam gutter means to receive ink therefrom and selectively forces the collected ink back to an ink supply reservoir, the second and third pressure chambers being in communication with the ink supply reservoir for supplying ink to said nozzle at a constant flow rate, said at least three pressure chambers of said pump means being coaxial cylindrical chambers and being operatively connected to a single drive member.

2. An ink jet system printer according to claim 1, wherein said second pressure chamber is operatively connected to said ink reservoir to receive ink therefrom and selectively forces the ink to a first pressure accumulator.

3. An ink jet system printer according to claim 2, wherein said first pressure accumulator is additionally operatively connected to said ink reservoir for returning excess ink thereto.

4. An ink jet system printer according to claim 2, wherein said third pressure chamber is operatively connected to said first pressure accumulator means to receive ink therefrom and selectively forces the ink to a second pressure accumulator means being connected by means of a conduit to said nozzle, said second pressure accumulator including a pressure sensing means operatively connected thereto for sensing variations in the ink pressure caused by variations in the viscosity of the ink.

5. An ink jet system printer according to claim 4, wherein said second pressure accumulator means is a chamber having a bellows connected to and sealing one end thereof, said bellows being operatively connected to a pole adapted to reciprocate thereby selectively actuating a switch which actuates a valve drive circuit operatively connected to said valve means, said valve means being operatively connected to an ink supply means and an ink solvent supply means and to said ink reservoir, wherein said valve means supplies ink from said ink supply means to said ink reservoir during normal operating conditions and said valve means supplies an ink solvent from said ink solvent supply means to said ink reservoir when the pressure sensing means senses an ink pressure above a predetermined pressure.

6. An ink jet system printer according to claim 5, wherein said switch is a microswitch.

7. An ink jet system printer according to claim 5, wherein said switch is a pressure transducer.

8. An ink jet system printer according to claim 5, wherein said switch is a pair of photo elements for sensing the movement of said pole.

9. An ink jet system printer according to claim 4, wherein said third pressure chamber is formed between said third diaphragm and an end wall of said housing.

10. An ink jet system printer according to claim 9, wherein during a forward movement of said piston the pressure in said third pressure chamber is increased to force ink to said second accumulator means operatively connected to said nozzle.

11. An ink jet system printer according to claim 9, wherein during a reverse movement of said piston the pressure in said third pressure chamber is decreased causing ink to be drawn into said third pressure chamber from said first accumulator means.

12. An ink jet system printer according to claim 2, wherein said second pressure chamber is formed between a second diaphragm and a third diaphragm said second diaphragm being larger in diameter relative to said third diaphragm.

13. An ink jet system printer according to claim 12, wherein during a forward movement of said piston the pressure in said second pressure chamber is increased to force ink to said first accumulator means.

14. An ink jet system printer according to claim 12, wherein during a reverse movement of said piston the pressure in said second pressure chamber is decreased, caused by the second diaphragm being larger in diameter than said third diaphragm, causing ink to be drawn into said second pressure chamber from said ink reservoir.

15. An ink jet system printer according to claim 1, wherein said first pressure chamber is formed between a first diaphragm and a second diaphragm, said first diaphragm being larger in diameter relative to said second diaphragm.

16. An ink jet system printer according to claim 15, wherein during a forward movement of said piston the pressure in said first pressure chamber is increased to force collected ink back to said ink reservoir.

17. An ink jet system printer according to claim 15, wherein during a reverse movement of said piston the pressure in said first pressure chamber is decreased, caused by the first diaphragm being larger in diameter than said second diaphragm, causing said collected ink to be drawn into said first pressure chamber.

* * * * *

UNITED STATES PATENT AND TRADEMARK OFFICE
CERTIFICATE OF CORRECTION

PATENT NO. : 4,357,617

DATED : November 2, 1982

INVENTOR(S) : Shimazawa et al.

It is certified that error appears in the above-identified patent and that said Letters Patent is hereby corrected as shown below:

In the heading, under the title "[75] Inventors:", change the name of the inventor from "Toshiaki Kawamoto" to --Toshiaki Tabuchi--.

Signed and Sealed this

*First* Day of *May 1984*

[SEAL]

*Attest:*

GERALD J. MOSSINGHOFF

*Attesting Officer* *Commissioner of Patents and Trademarks*